April 17, 1934.  R. W. SHENTON  1,954,894
METHOD OF COOKING AND TOASTING
Filed Feb. 4, 1933  6 Sheets-Sheet 1
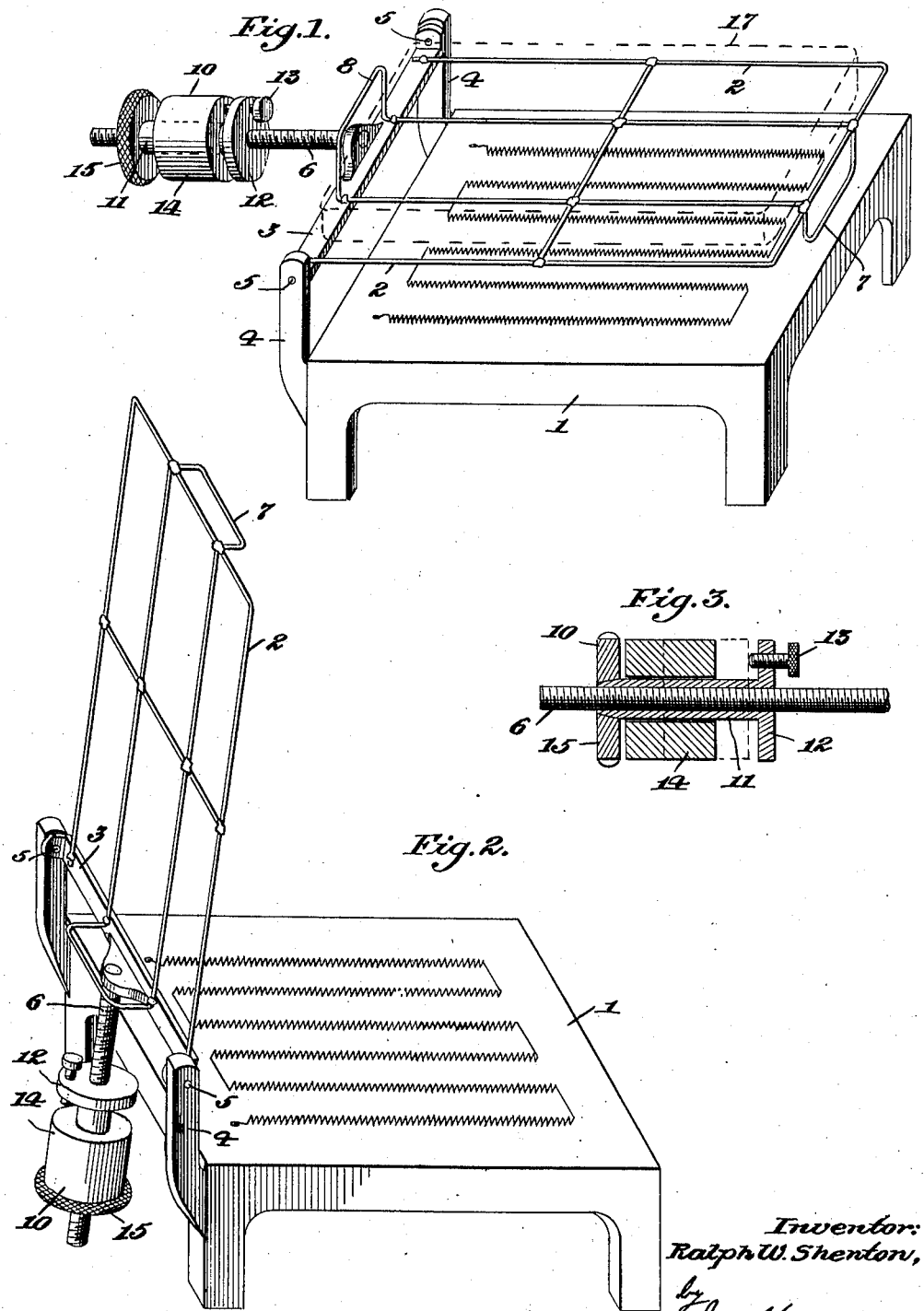
Inventor:
Ralph W. Shenton,
by Joseph W. Harris
Att'y.

April 17, 1934.  R. W. SHENTON  1,954,894
METHOD OF COOKING AND TOASTING
Filed Feb. 4, 1933  6 Sheets-Sheet 2
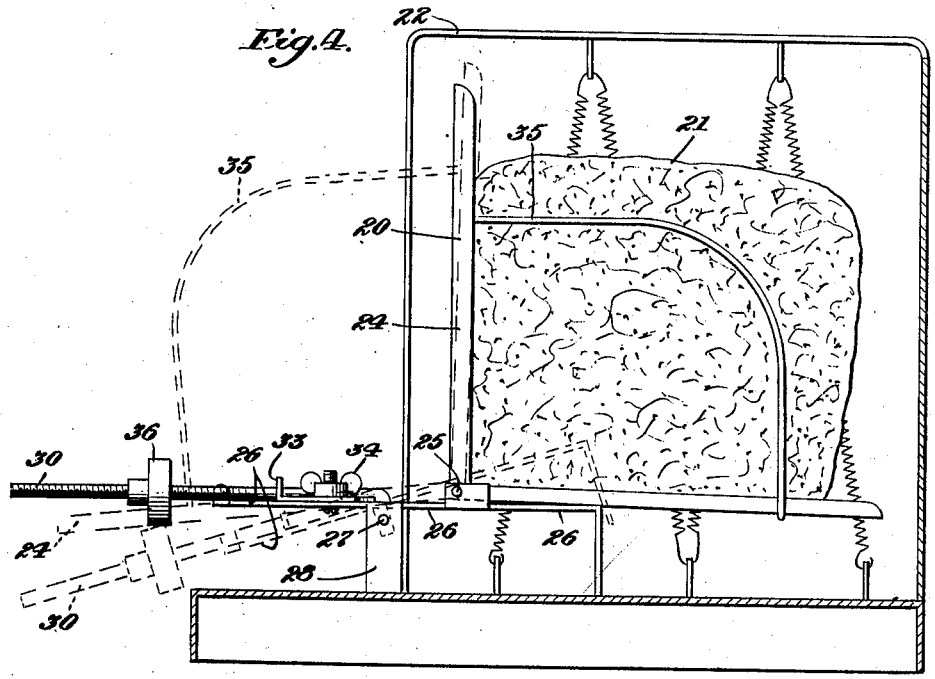
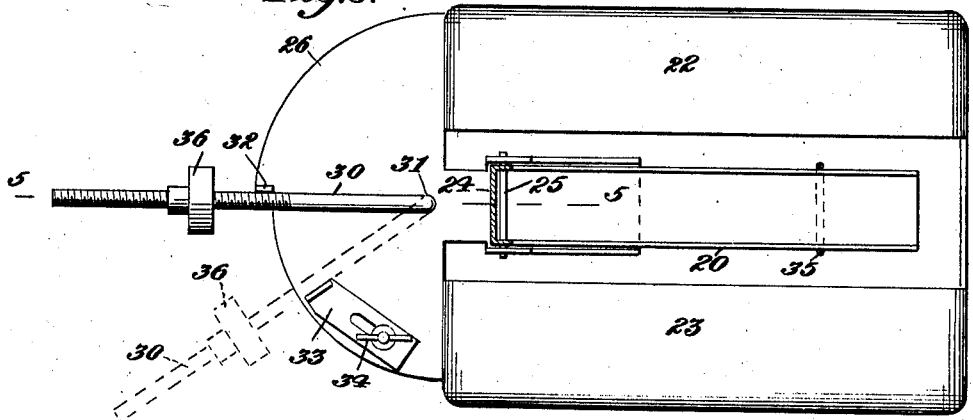
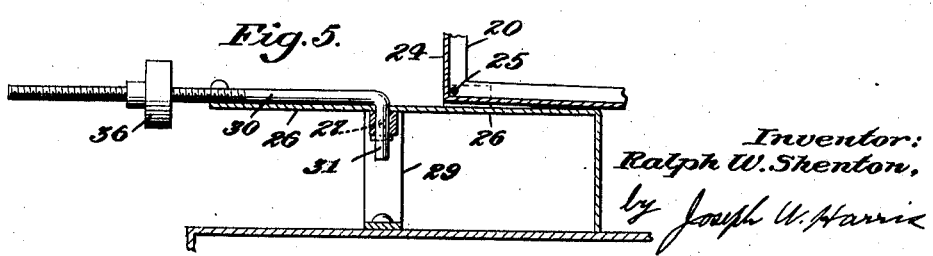
Inventor:
Ralph W. Shenton,
by Joseph W. Harris
Att'y.

April 17, 1934.　　　R. W. SHENTON　　　1,954,894
METHOD OF COOKING AND TOASTING
Filed Feb. 4, 1933　　　6 Sheets-Sheet 3
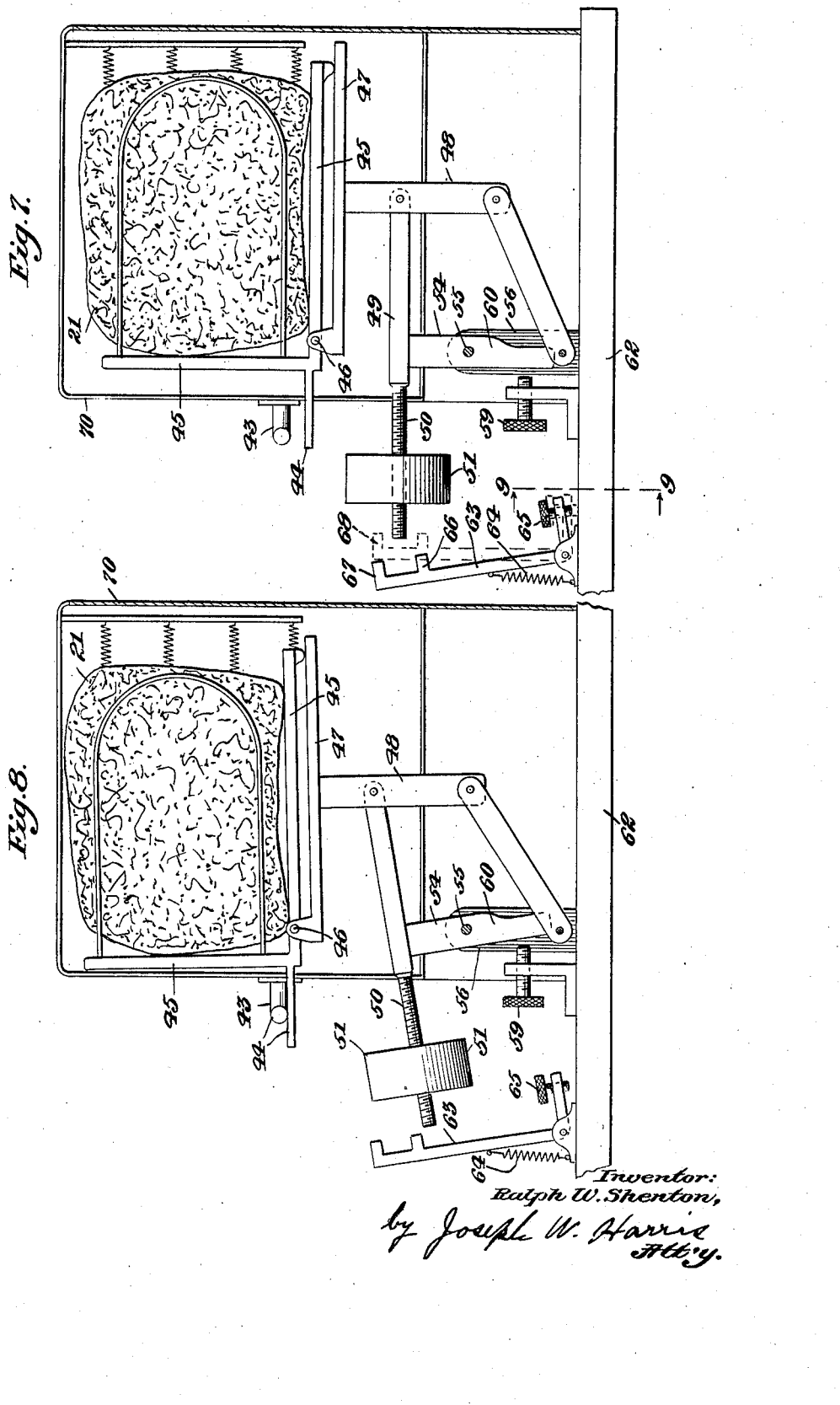
Inventor:
Ralph W. Shenton,
by Joseph W. Harris
Att'y.

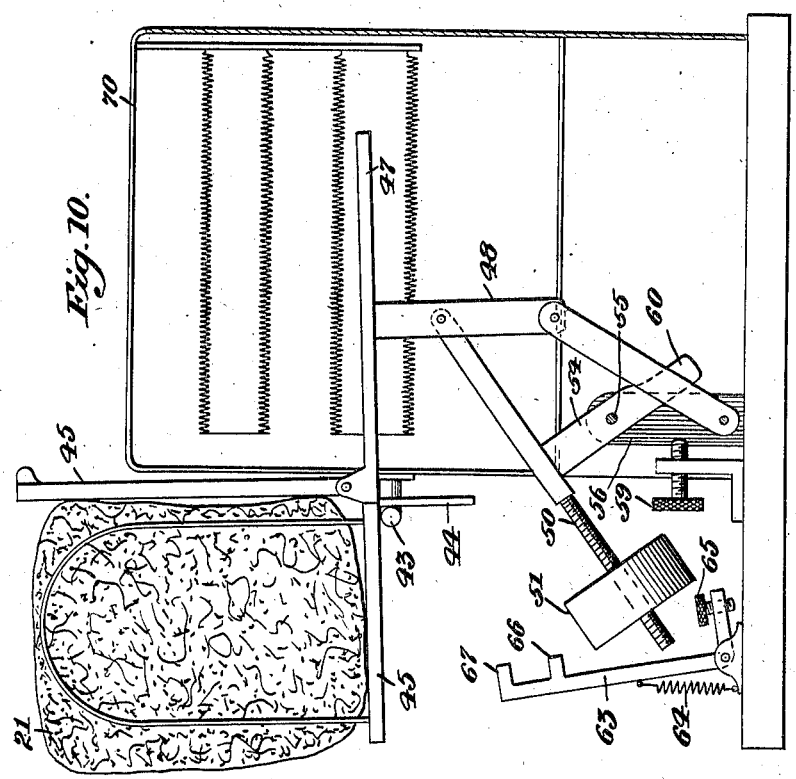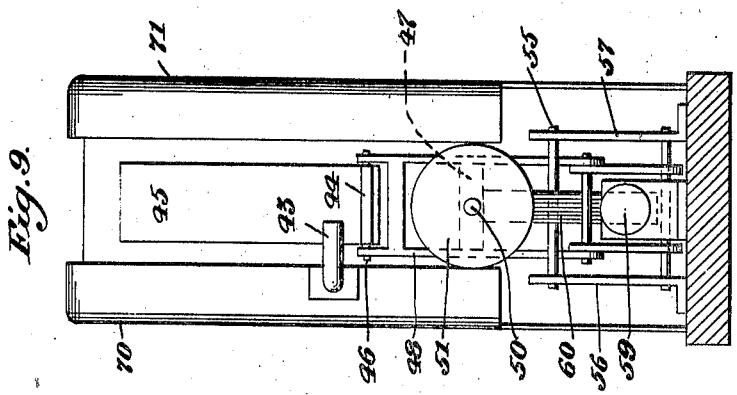

April 17, 1934.  R. W. SHENTON  1,954,894
METHOD OF COOKING AND TOASTING
Filed Feb. 4, 1933  6 Sheets-Sheet 5
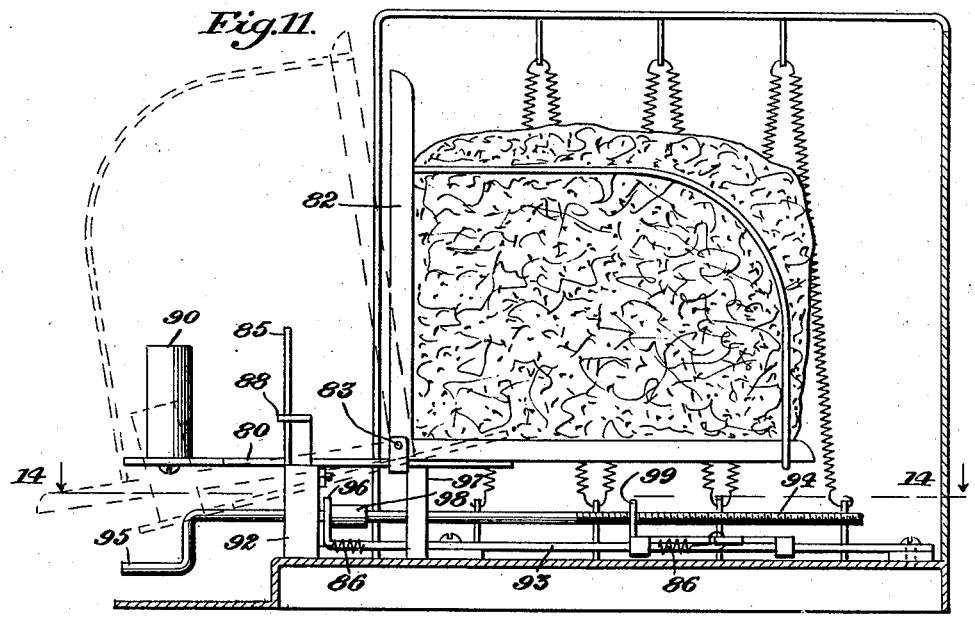
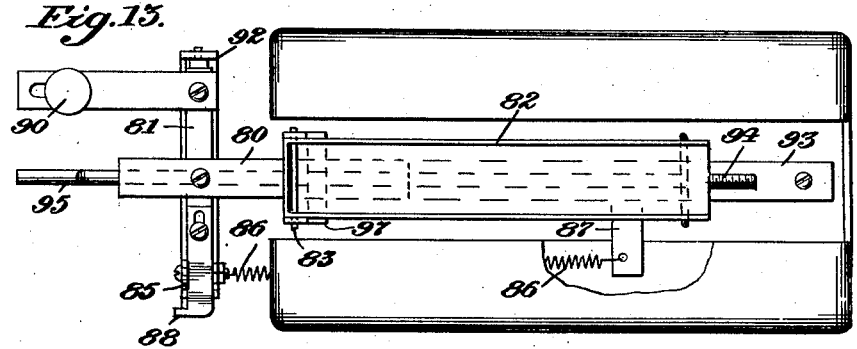
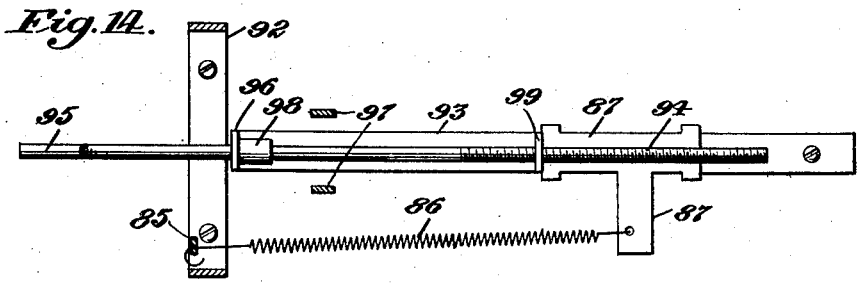
Inventor.
Ralph W. Shenton
by Joseph U. Harris
Att'y.

April 17, 1934.  R. W. SHENTON  1,954,894
METHOD OF COOKING AND TOASTING
Filed Feb. 4, 1933  6 Sheets-Sheet 6
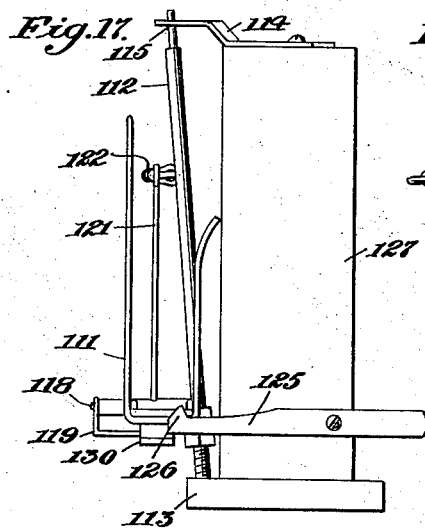
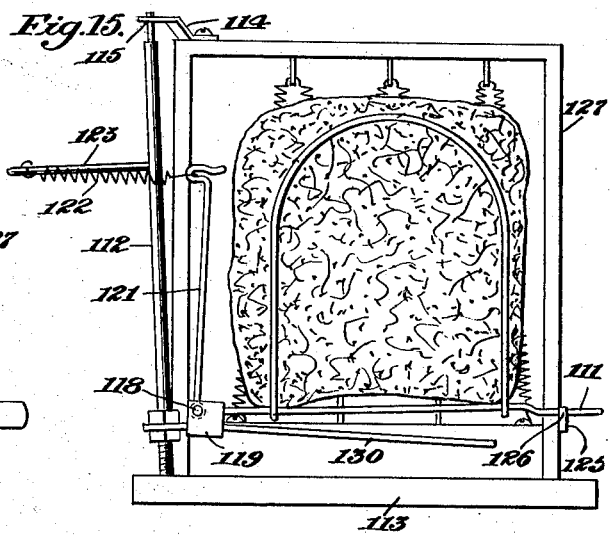
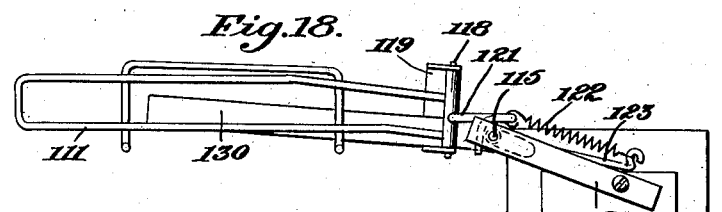
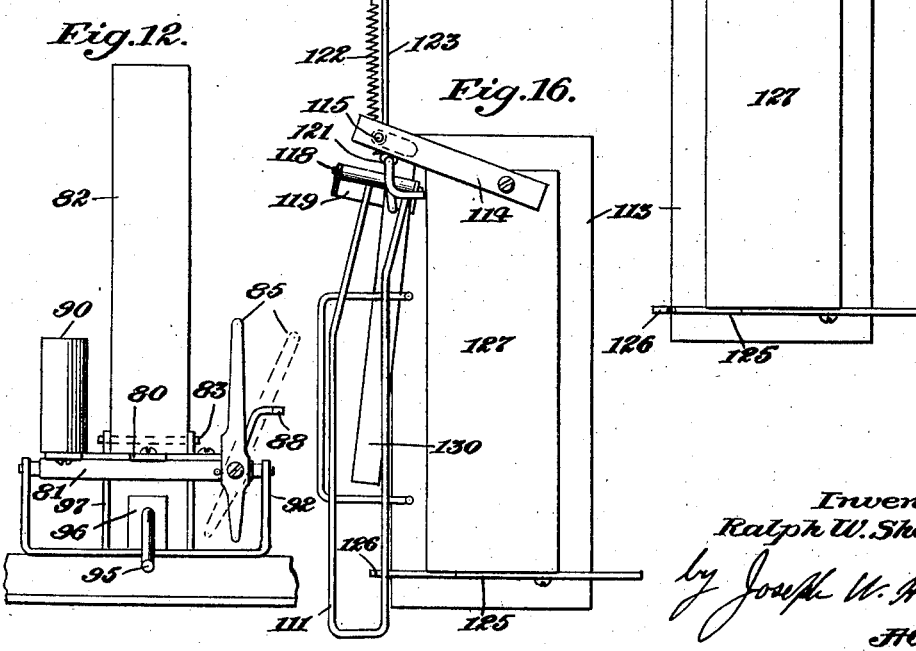
Inventor:
Ralph W. Shenton,
by Joseph W. Harris
Att'y.

Patented Apr. 17, 1934

1,954,894

UNITED STATES PATENT OFFICE 1,954,894

METHOD OF COOKING AND TOASTING

Ralph W. Shenton, Shaker Heights, Ohio

Application February 4, 1933, Serial No. 655,233

6 Claims. (Cl. 53—5)

This invention relates to methods of automatic cooking, specifically the automatic toasting of bread, etc., by taking advantage of the loss of weight experienced by the article being cooked, baked, or toasted, etc., and automatically discontinuing subjecting the article, or bread, to the influence of the source of heat which is used to effect the cooking, baking, or toasting operation.

An object of the invention is to provide a method of automatically discontinuing subjecting the article being cooked, baked, or toasted, to the influence of the source of heat, when the article had been sufficiently cooked, baked, or toasted.

A further object is to provide a method of adjusting the parts of the apparatus so that articles of different weights and sizes may be cooked, baked, or toasted to a desired degree, which articles having then lost a certain amount of weight, will automatically cease to be subject to the influence of the source of heat which effects the cooking, baking, or toasting.

A further object is to provide a method of automatically controlling the time period of cooking or toasting by the loss in weight of the article during the cooking or toasting thereof.

A further object is to provide a method of automatically removing the article being cooked, baked, or toasted, out of the influence of the source of heat, when the article has been sufficiently cooked, baked, or toasted.

A further object is to provide a method of adjusting the parts of the apparatus so that articles of different weights and sizes may be cooked, baked, or toasted to a desired degree, which articles having then lost a certain amount of weight, will be automatically removed from the influence of the source of heat which effects the cooking, baking or toasting.

Other objects of the invention will be apparent to those skilled in the art upon reading the specification.

In the accompanying drawings,

Figs. 1 and 2 illustrate diagrammatically one modification of the invention which may be used for toasting bread, or broiling a piece of meat, for example a lamb chop or the like, on one side at a time, Fig. 1 showing the grill frame in the horizontal or operating position, and Fig. 2 in the discharged or completed position;

Fig. 3 illustrates in section and elevation an adjusting weight shown in Figs. 1 and 2;

Figs. 4, 5, and 6 illustrate respectively a further modification, diagrammatically of a toaster, in which Fig. 4 is a view partly in section, and partly in elevation showing a slice of bread in the toasting position in full lines, and in the discharge position in dotted lines; Fig. 5 is a broken view looking downward on the line 5—5 of Fig. 6, showing the adjustable weight arm, and one corner of the pivoted bread holder; and Fig. 6 is top plan view.

Figs. 7, 8, 9 and 10 illustrate respectively a further modification, diagrammatically, in which Fig. 7 is a view in section and elevation of one type of toaster at the beginning of a toasting operation; Fig. 8 resembles Fig. 7, and shows the position of the moving parts after the toasting operation is completed and the toast is in the process of being removed. Fig. 9 is an end view looking to the right of the line 9—9 of Fig. 7; and Fig. 10 shows the bread holder in the discharged position with the weight down after the toasting operation has been completed;

Figs. 11, 12, 13 and 14 illustrate respectively a further modification, diagrammatically, of a toaster, in which Fig. 11 is a view partly in section and partly in elevation, showing a slice of bread in the toasting position in full lines, and in the discharge position in dotted lines; Fig. 12 shows diagrammatically an end plan view from the left of Fig. 11; Fig. 13 shows diagrammatically a top plan view, and Fig. 14 shows diagrammatically a plan view looking downward on the line 14—14 of Fig. 11, of the balance adjusting arm with the spring tension means; and Figs. 15, 16, 17 and 18 illustrate respectively a further modification, diagrammatically of a toaster, for toasting on one side at a time, in which Fig. 15 is a view partly in section and partly in elevation showing a slice of bread in the toasting position in full lines with the spring under tension; Fig. 16 shows diagrammatically a top plan view of Fig. 15 with the bread removed; Fig. 17 shows diagrammatically an end plan view looking from the left of Fig. 15; and Fig. 18 is a top plan view, diagrammatically of the toaster in the discharge position with the bread holder away from the heating coils, and the slice of bread removed from the heating influence.

It is known that food products lose a portion of their weight when subjected to the operation of cooking, baking, toasting, etc. when a slice of bread is properly toasted on both sides, it has been found that it loses roughly from about ten percent to about twenty-five percent of its weight in the process of toasting, depending on the kind of bread and the degree of toasting desired, and with a device of the type illustrated and described herein, when properly adjusted, such a loss in weight is sufficient to cause an automatic apparatus to function and effect a discontinuance of the cooking, baking, or toasting operation, for example, sufficient to cause the bread holder of the toaster to be tilted and removed from the influence of the heating coils, or to actuate an electric switch and thereby open the heating element circuit, or by other means.

In Fig. 1, a suitable heater 1, which is illustrated as an electric heater, but which may also be a gas heater or a suitable coal or oil heater, is provided with a grill 2, the grill being mounted on a bar 3 which latter is suitably pivoted upon the uprights 4 at 5. To the bar 3 is secured a shaft 6, shown provided with a screw thread, and upon which is mounted an adjustable weight element 10, consisting of a threaded sleeve 11 (Fig. 3) provided with a flange 12, through which passes an adjustable screw 13; upon the sleeve 11 is placed the movable counter weight 14, and thereafter the knurled flange 15 is secured to the sleeve 11, for example, by welding, riveting, or otherwise. The grill 2 is provided with a suitable rest 7, and a "stop" bracket 8 which latter prevents the slice of bread or other article from sliding off when the grill is tilted. When it is desired to cook an article, for example, toast a slice of bread, the bread 17, shown in dotted lines in Fig. 1 is placed upon the grill 2 and the counter weight 14 of weight element 10 is moved against the flange 15; the entire weight element 10 is then adjusted by turning the knurled flange 15 forwards or backwards until the grill 2 is just balanced, which will be determined by the rest 7 just touching the base of the heater 1. The movable counter weight 14 is then moved to the right until it touches the adjustable screw 13, as shown in Fig. 1, and in dotted lines in Fig. 3, which introduces an "over-balanced" condition in favor of the toast side, since in effect it shortens the leverage on which the weight 10 operates, sufficient in amount to hold it down until the bread has lost a certain amount of weight, as determined by the adjustment of the screw 13, which adjustment may be varied for different food products, etc. The electric current is then turned on the heating coils, if not already turned on, by means of a switch not shown, and as the bread becomes toasted it loses sufficient in weight for the weight element 10 to pull the grill 2 upwards, the grill and its load becoming under-balanced, and as the angle of tilt increases, the weight 14 will slide from the position shown in Fig. 1 to the flange 15 and thereby increase the gravitational pull and complete the tilting, as shown in Fig. 2, removing the bread from the heating influence of the electric heater. With a device of the type shown in Fig. 1, the slice of bread is then toasted on the other side, by readjusting the weight element 10, and counter weight 14.

In the modification, shown in Figs. 4, 5, and 6, the bread holder 20 is shown holding a slice of bread 21, Fig. 4; in a vertical position between a pair of suitable electric heating elements, 22 and 23, Fig. 6. The bread holder 20 consists of a bracket 24, pivoted at 25 to the tiltable support 26 which latter is pivoted at 27, upon two uprights 28 and 29. The tiltable support 26 is provided with a movable arm 30, which is movable about the center 31 between the fixed limit 32 and an adjustable stop 33, Fig. 6. The adjustable stop 33 is secured in a desired position by means of the thumb screw 34 to provide for a desired percentage loss in weight of the bread to be toasted. The threaded arm 30 is provided with an adjustable counterweight, 36, Fig. 6.

When it is desired to toast a slice of bread, the bread 21 is placed in the wire frame 35, Fig. 4, as indicated by dotted lines, and the bracket 24, Fig. 4, tipped between the heating elements 22 and 23. The counter weight 36, Fig. 4 is turned forward or backward on the threaded arm 30, Fig. 4, while the arm 30 is against the fixed stop 32, Fig. 6, until the mechanism is in a state of balance. The arm 30, Fig. 6, is then moved against the previously adjusted stop 33. This has the effect of shortening the leverage on which the weight 36 acts, thereby disturbing the previous state of balance of the support 26, Fig. 4, referred to above. Thereafter the heating current is turned on, if it has not already been turned on, and the toasting operation begun. During the toasting operation the bread will lose a portion of its weight, as referred to above, and after it has lost a predetermined percentage of said weight as determined by the setting of the adjustable stop 33, the weight 36 will over-balance the reduced weight of the toasted bread, causing the weight side of the support 26 to descend while the bread side of the mechanism ascends, until the bracket 24 because of its momentum and displaced center of gravity, tips over backwards from between the heating coils, as indicated in dotted lines at the left of Fig. 4 corresponding to the position in which the bread was originally placed therein. The toasting operation has now been completed and the toast may be removed.

In the modification, shown in Figs. 7, 8, 9 and 10, the bread holder 45 is pivoted at 46 upon the platform 47 of a suitable scale structure, for example a parallelogram type of scale 48, a member 49 of which is provided with a threaded shaft 50 upon which is mounted an adjustable weight 51. A depending member 54 is pivoted at 55 between uprights 56, 57, Fig. 9, and has an extension 60 which is adapted to contact with the adjusting screw 59. On the base 62 is mounted the adjustable forked arm 63, normally held back by the spring 64, the arm 63 being provided with an adjusting screw 65. The upper end of the arm 63 is provided with spaced tongues 66, 67, between which the end of the shaft 50 is adapted to swing while the arm 63 is pressed to the right as shown in dotted lines, during the adjustment of the device. The bread holder 45 is provided with an arm 44 which is adapted to engage the lug 43 as described hereafter, and as shown in Figs. 8 and 10. To use this modification, a slice of bread 21 is placed in the bread holder 45, Fig. 7, the forked adjustment arm 63 moved forward to the position shown in dotted lines at 68, which position is controlled by the screw 65. The weight 51 is then adjusted by turning in either direction until the end of the shaft 50 floats freely between the tongues 66, 67, whereupon the arm 63 should be released. The apparatus is now in balance. The adjustable screw 59 determines the amount of swing over center, which subtracts mechanical advantage from the weight side, at the same time adding mechanical advantage to the bread side, by a definite percentage depending on the particular setting employed of screw 59. This destroys the established balance. The electric current is then turned on if not already on, and the toasting started. As soon as the bread has lost sufficient weight to restore the condition of balance, it will immediately thereafter start to swing upward with accumulating velocity and momentum due to the shifting of mechanical advantage back to the weight side. When the mechanism is in the position shown in Fig. 8, the arm 44 engages the lug 43. During the ascent of the platform 47 it also moves to the left as shown by the extended position of the arm 44 to the left under the lug 43 in Fig. 8. The continued upward movement of the platform 47 causes the bread holder 45 to be tilted outward as shown in Fig. 10, due to the engagement of the arm 44 with the lug 43, thereby removing the slice of bread 52 from the influence of the electric heaters 70, 71.

In the modification shown in Figs. 11, 12, 13 and 14 is shown a type of mechanism using a spring instead of gravity as the actuating force to take the bread out of the influence of the heating coils when the toasting operation is completed. A support, 80, mounted upon a swivelled bar 81, and provided with downwardly extending stops 97, carries a pivoted breadholding bracket 82, pivoted at 83. The bar 81 is provided with an oscillatable lever 85, Fig. 12, to the lower extension of which is attached one end of a spring 86, the other end of said spring 86 being attached to a movable member 87. The bar 81 is provided with an adjustable stop 88, which limits the movement of said lever 85, the position of the adjustable stop 88 is determined by the desired loss of weight to be experienced by the bread being toasted. The bar 81 is also provided with a fixed weight 90, purposely designed with a high center of gravity, of such weight as to approximately balance the empty mechanism when the spring 86 is not under tension.

The bar 81 is pivoted on a support 92, and adjacent the lower portion of said support 92, extends a guide 93 provided with a turned-up end 96 which forms a bearing for screw 94, which latter has a collar 98 to prevent its forward longitudinal movement, and upon the guide 93 is a travelling member 87. Said member 87 is shown provided with a lug 99, provided with a threaded opening through which passes an adjusting screw 94, which latter is provided with a suitable handle 95.

To perform the toasting operation in this modification, a slice of bread is placed in the bracket 82, after which it is tipped between the heating elements and the screw 94 turned by its handle 95 backward or forward with the lever 85 in the vertical position shown in Fig. 12, until the support 80 and bracket 82 are in a substantially balanced position. The lever 85 is now moved to the dotted inclined position shown in Fig. 12, which effects a shortening of the leverage on which the spring acts, by bringing the lower end of the lever 85 nearer to the axis of rotation of the bar 81, thereby throwing a mechanical advantage in favor of the bread side of a definite percentage as determined by the setting of the stop 88. The electric current is now turned on, if it has not already been turned on, and the toasting operation begun. Upon the loss of a predetermined amount of weight by the bread, spring 86 which is under tension now overcomes the balanced adjustment of the support 80, and lifts the bracket side of said support. The movement of said support 80 is accelerated by the favorable shifting of the center of gravity toward the left (Fig. 11) and accumulated momentum, which effect a tipping over backward of the bread holding bracket 82, which now assumes the position shown in the dotted lines in Fig. 11. The toasting operation is now completed.

In the modification, shown in Figs. 15, 16, 17 and 18, which show means for toasting a slice of bread on one side placed vertically adjacent an electric heating element, is mounted a rotatable breadholding support, 111, mounted on a leaning shaft, 112, placed nearly vertical, the lower end of said shaft 112 being rotatably supported on the base of the toaster, 113, the upper end of said shaft being supported and swivelled at 115 in an arm 114 which extends outward and backward from a vertical line above the lower support of said shaft 112. The reason for said shaft 112 being supported in a leaning position is that when free, the support 111 will swing away from the heating element and will be referred to hereafter. Said bread holding support 111 is swivelled at 118 in a bracket 119 secured to the arm 130, the end of which is secured to said shaft 112, whereby said breadholding support 111 has a limited rotative movement about said swivel 118. Projecting upwardly from said swivel 118 is an arm 121 adapted to engage at its upper end one end of a spring 122, the other end of said spring 122 being engaged by an arm 123 projecting backwardly from said shaft 112. Suitably supported upon the body of the toaster is a movable latch 125 provided with a tongue 126 the inner surface of which is adapted to detachably engage the front end of the bread holder 111, and hold said bread holder in operative proximity to the electric heating element 127, whereby a slice of bread to be toasted would be subjected to the influence from said heating element while so engaged by the tongue 126 of the latch 125. After the bread has been toasted, a loss of weight will have been experienced by the bread thereby disturbing the balance, and causing the spring retracted breadholder 111 to rise and become disengaged from said tongue 126, leaving the bread holder free to act under the force of gravity and swing outward due to the lowering of the center of gravity in the open position as shown in Fig. 18 by virtue of the leaning position of the shaft 112, referred to above.

When it is desired to toast a slice of bread, the bread holder 111 will normally be in the position illustrated in Fig. 18. A slice of bread will be placed in the bread holder, whereby said bread holder will be depressed and the spring 122 elongated, and said holder then moved into a position substantially parallel with the heating element. The latch 125 is now raised until the tongue 126 just engages the bread holder in its depressed position and retains the same in an operative position, until the bread having lost a certain percentage of its weight by the toasting operation causes the bread holder to rise and become disengaged from the tongue 126, and is then free to swing outward to the position shown in Fig. 18. The bread is now reversed in the toaster and the toasting operation repeated on the other side.

It will be seen that in a toaster of this type the principle of first balancing the bread and then readjusting the device to provide the equivalent of adding mechanical advantage to the bread side of the mechanism as employed in the previously illustrated types. To illustrate—assume that the bread holding support 111, with a piece of bread to be toasted, is placed in the operating position adjacent to the heating coils, and that the latch 125 is adjusted so that the uppermost point of the tongue 126 just barely engages the bread-holding support 111 and prevents it from swinging away from the heating coils. Under these conditions, the apparatus would be in a state of approximate equilibrium, for a very slight loss of weight on the part of the bread would result in the bread holder rising and escaping from the latch. If now (for the sake of illustration) an added weight were placed on the bread holder 111, which would correspond to a re-adjustment of latch 125, this state of equilibrium or balance with respect to the topmost point of latch tongue 126 would be disturbed and the breadholder would slide down below said point to a new position depending on the amount of weight added. The bread would now have to lose an amount of weight corresponding to the hypothetical weight added before it would again be at the point where a slight additional loss of weight would allow the bread holder to escape. In other words, with the bread balanced just opposite the topmost point of the latch tongue 126 a condition favorable to almost immediate removal of the bread from the toasting coils is established. Adding weight or readjusting the latch 125 over-balances the bread holder so that it settles below the point favorable to escape of the particular piece of bread being toasted, thus delaying the removal of the bread in a controllable manner. It will be seen that if instead of adding weight to depress the bread holder below the point where the latch barely engages it, the latch itself is raised above this point by an amount depending on the degree of toasting desired the same result is accomplished without the use of additional weights.

The principle of discontinuing the cooking or toasting of food automatically, by the loss in weight of the food, as described above, is capable of many applications by means of many types of devices. In toasting devices, it may be applied to multiple toasters with or without individual control for each slice of bread; or in general cooking operation, frying pans may be suitably held in proximity to a source of heat, for example, on the grill in Fig. 1, and meat cooked in the pan, the cooking discontinued after the meat has lost its predetermined percentage of weight; such applications are considered to be within the scope of the present invention.

I claim:

1. The method of cooking food which comprises supporting the food in a substantially balanced position adjacent a source of heat, increasing the leverage on the food side, and automatically quickly removing the food from the source of heat when it has lost a predetermined percentage of its original weight thereby causing a shift of the leverage from the food side.

2. The method of toasting bread, which comprises supporting the bread in a substantially balanced position adjacent a source of heat, increasing the leverage on the bread side, and automatically quickly removing the bread from the source of heat when it has lost a predetermined percentage of its original weight thereby causing a shift of the leverage from the bread side.

3. The method of toasting bread, which comprises supporting the bread to be toasted in a balanced position adjacent a source of heat, establishing an over-balanced condition to impart a quick discharge, toasting the bread until it has lost a predetermined percentage of its original weight thereby creating an under-balanced weight condition of said bread, permitting the overbalanced support to automatically remove said bread from the toasting influence of said source of heat.

4. The method of toasting bread, which comprises placing the bread in a substantially balanced position on a toaster in proximity to a source of heat, creating an overbalance to delay the subsequent discharge of the bread, toasting the bread to a desired degree thereby disturbing its overbalanced position sufficiently to automatically remove said bread from the influence of the source of heat.

5. The method of automatically toasting bread, which comprises supporting said bread upon a gravity influenced spring retractable holder, moving said holder against the action of said spring to a position adjacent a source of heat, releasably latching said holder adjacent said heat, toasting said bread by said heat until said bread has lost a predetermined percentage of its weight, whereupon said holder automatically unlatches and is quickly removed by said spring from said source of heat.

6. The method of automatically toasting bread, which comprises supporting said bread upon a gravity influenced spring retractable holder, moving said holder against the action of said spring to a position adjacent a source of heat, controllably latching said holder adjacent said heat, toasting said bread by said heat until said bread has lost a predetermined percentage of its weight, whereupon said holder automatically unlatches and is quickly removed by said spring from said source of heat.

RALPH W. SHENTON.